US010985957B2

(12) United States Patent
Lopez et al.

(10) Patent No.: US 10,985,957 B2
(45) Date of Patent: Apr. 20, 2021

(54) MIXED NUMEROLOGY OF DMA SYSTEM FOR SINGLE DFT RECEIVER

(71) Applicant: Telefonaktiebolaget LM Ericsson (publ), Stockholm (SE)

(72) Inventors: Miguel Lopez, Solna (SE); Bo Hagerman, Morristown, NJ (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/775,467

(22) PCT Filed: Oct. 13, 2016

(86) PCT No.: PCT/SE2016/050989
§ 371 (c)(1),
(2) Date: May 11, 2018

(87) PCT Pub. No.: WO2017/082793
PCT Pub. Date: May 18, 2017

(65) Prior Publication Data
US 2018/0270093 A1    Sep. 20, 2018

Related U.S. Application Data

(60) Provisional application No. 62/255,327, filed on Nov. 13, 2015.

(51) Int. Cl.
*H04L 27/26* (2006.01)
*H04L 5/00* (2006.01)
*H04J 11/00* (2006.01)

(52) U.S. Cl.
CPC .......... *H04L 27/2604* (2013.01); *H04J 11/00* (2013.01); *H04L 5/0007* (2013.01);
(Continued)

(58) Field of Classification Search
CPC .............. H04L 27/2604; H04L 5/0007; H04L 27/2607; H04L 5/0028; H04L 5/0037; H04L 27/2602; H04J 11/00
See application file for complete search history.

(56) References Cited

U.S. PATENT DOCUMENTS 9,210,023 B1*  12/2015  Nagaraja .............. H04L 27/265
2007/0195690 A1*  8/2007  Bhushan .............. H04L 5/0042
370/208
(Continued)

FOREIGN PATENT DOCUMENTS

WO    2006105005 A2    10/2006
WO    2010138921 A2    12/2010

OTHER PUBLICATIONS

Shilo, Shimi et al., "11ax Support for IoT", IEEE 802.11-15/1134r2, Huawei Technologies, Sep. 9, 2015, 1-19.
(Continued)

Primary Examiner — Thinh D Tran
(74) Attorney, Agent, or Firm — Murphy, Bilak & Homiller, PLLC

(57) ABSTRACT

A mixed numerology OFDM system is presented herein relative to a first OFDM numerology having a first subcarrier spacing and associated with a first signal having a first length. A second signal having a second length and associated with a second OFDM numerology having a second subcarrier spacing greater than the first subcarrier spacing is generated by generating a sub-frame comprising redundant data appended to each of a plurality of OFDM symbols and generating the second signal by appending group redundant data to the sub-frame such that the second length equals the first length. The number of OFDM symbols in the sub-frame is selected such that a length of the sub-frame is as large as possible without exceeding the length of the first OFDM
(Continued)

symbol in the first signal. The receiver may extract the first the first and second signals from a received composite signal using a single FFT.

16 Claims, 8 Drawing Sheets

(52) U.S. Cl.
CPC .......... *H04L 5/0028* (2013.01); *H04L 5/0037* (2013.01); *H04L 27/2602* (2013.01); *H04L 27/2607* (2013.01)

(56) References Cited

U.S. PATENT DOCUMENTS

| | | | |
|---|---|---|---|
| 2015/0207656 A1* | 7/2015 | Dhayni | H04L 27/2624 375/260 |
| 2018/0145802 A1* | 5/2018 | Hwang | H04L 5/0005 |
| 2018/0287761 A1* | 10/2018 | You | H04L 5/00 |
| 2019/0007250 A1* | 1/2019 | Kibutu | H04L 5/143 |

OTHER PUBLICATIONS

Unknown, Author, "NB LTE—Concept Description L 1", 3GPP TSG-RAN #69, RP-151397, Phoenix, Arizona, Sep. 14-16, 2015, 1-24.
Unknown, Author, "Overview of numerology candidates", 3GPP TSG RAN WG1 Meeting #85, R1-164271, Nanjing, China, May 23-27, 2016, 1-7.
Unknown, Author, "LTE Numerology Change for V2V/V2X Communication", 3GPP TSG RAN WG1 Meeting #82bis, R1-155327, Intel Corporation, Malmo, Sweden, Oct. 5-9, 2015, 4 pages.

\* cited by examiner

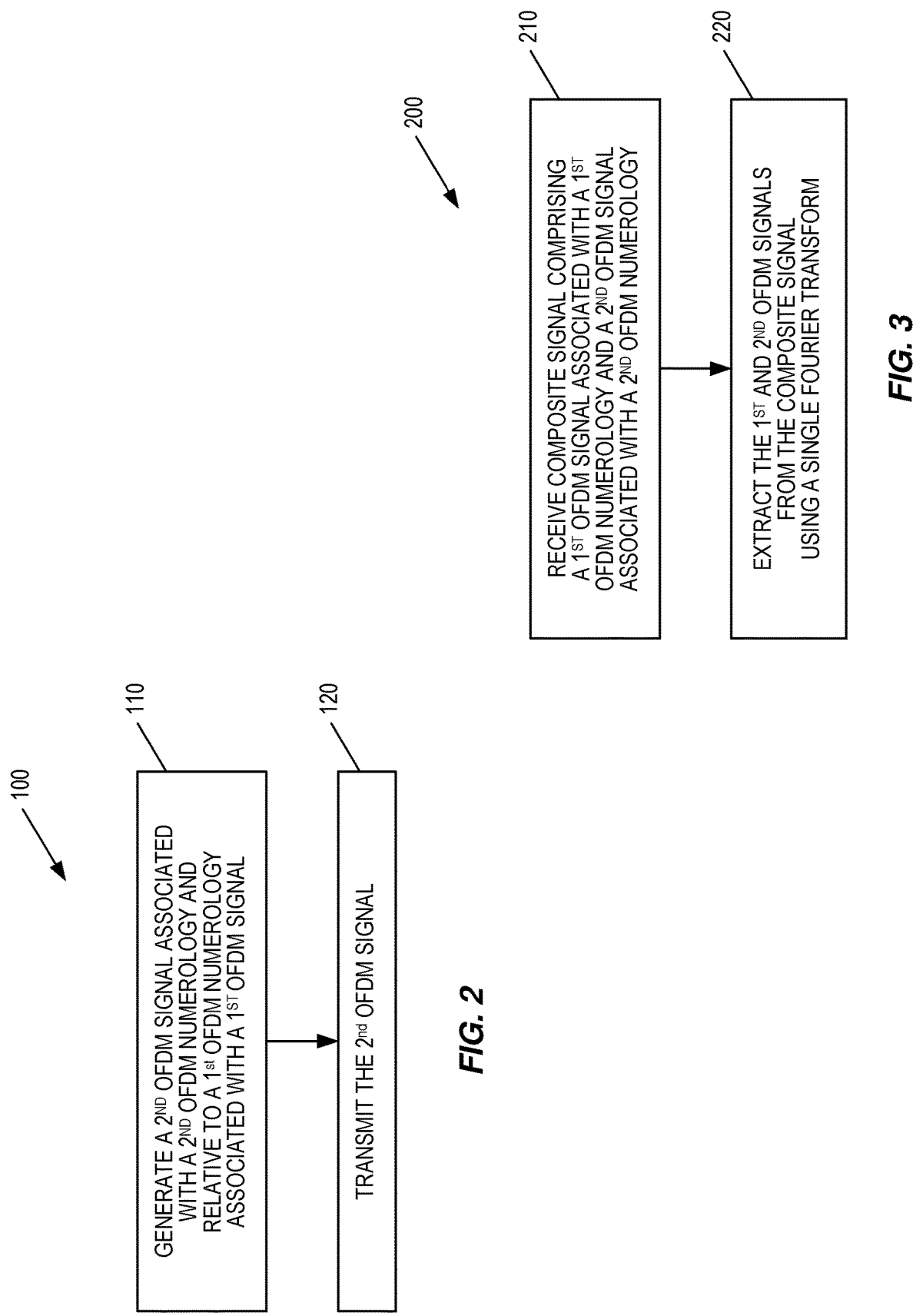

MIXED NUMEROLOGY OF DMA SYSTEM FOR SINGLE DFT RECEIVER

RELATED APPLICATIONS

This application claims priority to U.S. Provisional patent Application Ser. No. 62/255,327 filed 13 Nov. 2015, the entire contents of which are incorporated herein by reference.

BACKGROUND

Multi-device multicarrier systems with mixed numerology have been recently proposed because a fixed numerology multicarrier system is not flexible enough to accommodate the varied requirements (e.g. throughput, latency, etc.) of the multitude of devices that may need to share the spectrum. For example, Internet of Things (IoT) devices (e.g., a sensor), and broadband devices (e.g., a personal computer), have completely different requirements regarding battery consumption and throughput, and thus cannot be managed by a fixed numerology multicarrier system. Thus, mixed numerology multicarrier systems have been proposed for 5G and for NarrowBand Internet of Things (NB-IoT) (e.g., 3GPP TSG-RAN #69, RP-151397, 14-16 Sep. 2015), referred to herein as "3GPP NB-IoT."

Filtered Orthogonal Frequency Division Multiplexing (OFDM) is one of the candidates for 5G that allows mixing several OFDM numerologies in the same band. Filter Bank Multicarrier represents another candidate for 5G.

The NB-IoT system proposed in 3GPP NB-IoT includes in-band deployment, in which one Physical Resource Block (PRB) belonging to a Long Term Evolution (LTE) system is allocated to the LTE-like NB-IoT system, but using a different numerology. The NB-IoT numerology is obtained from the LTE numerology by, e.g., expanding all times by a factor of 6 and shrinking all frequencies by a factor of 6. In particular, the subcarrier spacing for NB-IoT is 2.5 kHz.

Energy efficiency and extended coverage in IoT is a concern. Many IoT devices will be battery operated, e.g., powered by a coin cell battery, and are intended to have very long lifetimes, e.g., up to several years. Extended coverage is another common requirement for IoT devices, because many devices may be located in places where the penetration loss is high, e.g., utility meters. For these reasons, power efficient modulations are desirable, especially when used at the IoT device transmitter. In particular, the use of constant envelope modulations is advantageous in IoT applications. In order to tackle the energy efficiency and coverage extension problems, 3GPP NB-IoT proposes to use a single subcarrier. This achieves constant envelope modulation, and allows boosting of the power for the single tone that is used.

IEEE is currently developing the 802.11ax amendment. This technology is primarily intended for broadband devices. It focuses on high efficiency and introduces the use of Orthogonal Frequency Division Multiple Access (OFDMA). On the other hand, there is a realization in the WiFi community that it would be useful to multiplex NB-IoT devices together with other devices in the 2.4 GHz and 5 GHz Industrial, Scientific, and Medical (ISM) frequency bands. The task group proposes to enhance the scope of 802.11ax in order to handle IoT devices as well, thus allowing multi-mode Base Station Subsystems (BSSs) (See, e.g., https://mentor.ieee.orq/802.11/documents?is_dcn=shilo&is_group=00ax). As is common in IEEE, the re-use of existing technology components and low complexity receivers is encouraged. Also, the data rates for the IoT devices are not expected to be too low, as relatively high data rates are seen as a competitive advantage with respect to other IoT technologies, e.g., Bluetooth low energy.

SUMMARY

The solution presented herein multiplexes multiple devices in the frequency domain, using OFDMA, where the devices are allowed to use varying OFDM numerologies, where certain constraints on the numerologies and on the packet formats are imposed, including a two-step redundant data insertion. These constraints allow the transmitter to use power efficient modulations while having flexibility on the choice of data rates. Further, the solution presented herein allows, at the receiver side, the use of a single Fourier Transform OFDM receiver covering the whole band in order to separate and decode the devices, which reduces the complexity at the receiver side.

To that end, one exemplary embodiment comprises a method, implemented by a transmitting radio node, for transmitting Orthogonal Frequency Division Multiplexing (OFDM) signals in a mixed numerology OFDM system relative to a first OFDM numerology. The first OFDM numerology has a first subcarrier spacing and associated with a first OFDM signal having a first length. The first OFDM signal comprises a first OFDM symbol having a first symbol length equal to the inverse of the first subcarrier spacing and less than the first length. The method comprises generating a second OFDM signal having a second length and associated with a second OFDM numerology having a second subcarrier spacing greater than the first subcarrier spacing. Generating the second OFDM signal comprises generating a sub-frame comprising second redundant data appended to each of a plurality of second OFDM symbols and generating the second OFDM signal by appending group redundant data to the sub-frame such that the second length of the second OFDM signal equals the first length of the first OFDM signal. The number of second OFDM symbols in the sub-frame is selected such that a length of the sub-frame is as large as possible without exceeding the first symbol length of the first OFDM symbol. The method further comprises transmitting the second OFDM signal relative to the first OFDM signal.

Another exemplary embodiment comprises a computer program product comprising software instructions which, when run on a processing circuit in a radio node, causes the radio node to transmit Orthogonal Frequency Division Multiplexing (OFDM) signals in a mixed numerology OFDM system relative to a first OFDM numerology. The first OFDM numerology has a first subcarrier spacing and associated with a first OFDM signal having a first length. The first OFDM signal comprises a first OFDM symbol having a first symbol length equal to the inverse of the first subcarrier spacing and less than the first length. When run on the processing circuit in the radio node, the software instructions cause the radio node to generate a second OFDM signal having a second length and associated with a second OFDM numerology having a second subcarrier spacing greater than the first subcarrier spacing. When run on the processing circuit in the radio node, the software instructions cause the radio node to generate the second OFDM signal by generating a sub-frame comprising second redundant data appended to each of a plurality of second OFDM symbols and generating the second OFDM signal by appending group redundant data to the sub-frame such that the second length of the second OFDM signal equals the first length of the first OFDM signal. The number of second OFDM symbols in the sub-frame is selected such that a length of the sub-frame is as large as possible without exceeding the first symbol length of the first OFDM symbol. When run on the processing circuit in the radio node, the software instructions cause the radio node to transmit the second OFDM signal relative to the first OFDM signal.

Another exemplary embodiment comprises a radio node configured to transmit Orthogonal Frequency Division Multiplexing (OFDM) signals in a mixed numerology OFDM system relative to a first OFDM numerology. The first OFDM numerology has a first subcarrier spacing and associated with a first OFDM signal having a first length. The first OFDM signal comprises a first OFDM symbol having a first symbol length equal to the inverse of the first subcarrier spacing and less than the first length. The radio node comprises one or more signal generation circuits and one or more transmitters. The signal generation circuit(s) are configured to generate a second OFDM signal having a second length and associated with a second OFDM numerology having a second subcarrier spacing greater than the first subcarrier spacing. The signal generation circuit(s) generate the second OFDM signal by generating a sub-frame comprising second redundant data appended to each of a plurality of second OFDM symbols and generating the second OFDM signal by appending group redundant data to the sub-frame such that the second length of the second OFDM signal equals the first length of the first OFDM signal. The number of second OFDM symbols in the sub-frame is selected such that a length of the sub-frame is as large as possible without exceeding the first symbol length of the first OFDM symbol. The transmitter(s) are configured to transmit the second OFDM signal relative to the first OFDM signal.

Another exemplary embodiment comprises a radio node configured to transmit Orthogonal Frequency Division Multiplexing (OFDM) signals in a mixed numerology OFDM system relative to a first OFDM numerology. The first OFDM numerology has a first subcarrier spacing and associated with a first OFDM signal having a first length. The first OFDM signal comprises a first OFDM symbol having a first symbol length equal to the inverse of the first subcarrier spacing and less than the first length. The radio node comprises one or more signal generation modules and one or more transmitter modules. The signal generation module(s) are configured to generate a second OFDM signal having a second length and associated with a second OFDM numerology having a second subcarrier spacing greater than the first subcarrier spacing. The signal generation module(s) generate the second OFDM signal by generating a sub-frame comprising second redundant data appended to each of a plurality of second OFDM symbols and generating the second OFDM signal by appending group redundant data to the sub-frame such that the second length of the second OFDM signal equals the first length of the first OFDM signal. The number of second OFDM symbols in the sub-frame is selected such that a length of the sub-frame is as large as possible without exceeding the first symbol length of the first OFDM symbol. The transmitter module(s) are configured to transmit the second OFDM signal relative to the first OFDM signal.

Another exemplary embodiment comprises a method, implemented by a receiving radio node, for processing received signals in a mixed numerology Orthogonal Frequency Division Multiplexing (OFDM) system. The method comprises receiving a composite signal comprising a first OFDM signal and a second OFDM signal. The first OFDM signal has a first length and is associated with a first OFDM numerology having a first subcarrier spacing. The second OFDM signal is associated with a second OFDM numerology different from the first OFDM numerology and has a second subcarrier spacing greater than the first subcarrier spacing. The method further comprises extracting the first OFDM signal and the second OFDM signal from the composite signal using a single Fourier Transform configured according to one of the first and second OFDM numerologies.

Another exemplary embodiment comprises a computer program product comprising software instructions which, when run on a processing circuit in a radio node, causes the radio node to process received signals in a mixed numerology Orthogonal Frequency Division Multiplexing (OFDM) system. When run on the processing circuit in the radio node, the software instructions cause the radio node to receive a composite signal comprising a first OFDM signal and a second OFDM signal. The first OFDM signal has a first length and is associated with a first OFDM numerology having a first subcarrier spacing. The second OFDM signal is associated with a second OFDM numerology different from the first OFDM numerology and has a second subcarrier spacing greater than the first subcarrier spacing. When run on the processing circuit in the radio node, the software instructions cause the radio node to extract the first OFDM signal and the second OFDM signal from the composite signal using a single Fourier Transform configured according to one of the first and second OFDM numerologies.

Another exemplary embodiment comprises a radio node for processing received signals in a mixed numerology Orthogonal Frequency Division Multiplexing (OFDM) system. The radio node comprises a receiver and one or more processing circuits. The receiver is configured to receiving a composite signal comprising a first OFDM signal and a second OFDM signal. The first OFDM signal has a first length associated with a first OFDM numerology having a first subcarrier spacing. The second OFDM signal is associated with a second OFDM numerology different from the first OFDM numerology and has a second subcarrier spacing greater than the first subcarrier spacing. The processing circuit(s) are configured to extract the first OFDM signal and the second OFDM signal from the received composite signal using a single Fourier Transform configured according to one of the first and second OFDM numerologies.

Another exemplary embodiment comprises a radio node for processing received signals in a mixed numerology Orthogonal Frequency Division Multiplexing (OFDM) system. The radio node comprises a receiver module and one or more processing modules. The receiver module is configured to receiving a composite signal comprising a first OFDM signal and a second OFDM signal. The first OFDM signal has a first length associated with a first OFDM numerology having a first subcarrier spacing. The second OFDM signal is associated with a second OFDM numerology different from the first OFDM numerology and has a second subcarrier spacing greater than the first subcarrier spacing. The processing module(s) are configured to extract the first OFDM signal and the second OFDM signal from the received composite signal using a single Fourier Transform configured according to one of the first and second OFDM numerologies.

BRIEF DESCRIPTION OF THE DRAWINGS

FIG. 2 shows an exemplary transmission method according to one exemplary embodiment.

FIG. 3 shows an exemplary reception method according to one exemplary embodiment.

DETAILED DESCRIPTION

Neither filtered OFDM nor filter bank multicarrier yield constant envelope modulations, unless one single subcarrier is used. The filters used in such systems require a guard band, which means sub-utilization of the available bandwidth. In NB-IoT, where the use of one single carrier has been proposed, there is no filtering, but there are unused subcarriers, and there is little flexibility in the achievable data rates. The data rate that can be achieved in practice is very limited because the narrow bandwidth (e.g., 2.5 kHz) does not allow data rates beyond the order of several hundreds of bits per second. Thus, there is a need to find designs for multi-user multi-carrier systems that make full use of the available bandwidth, allow power efficient modulations for some of the users, and do not require advanced or multi-antenna receivers.

Figure 1:
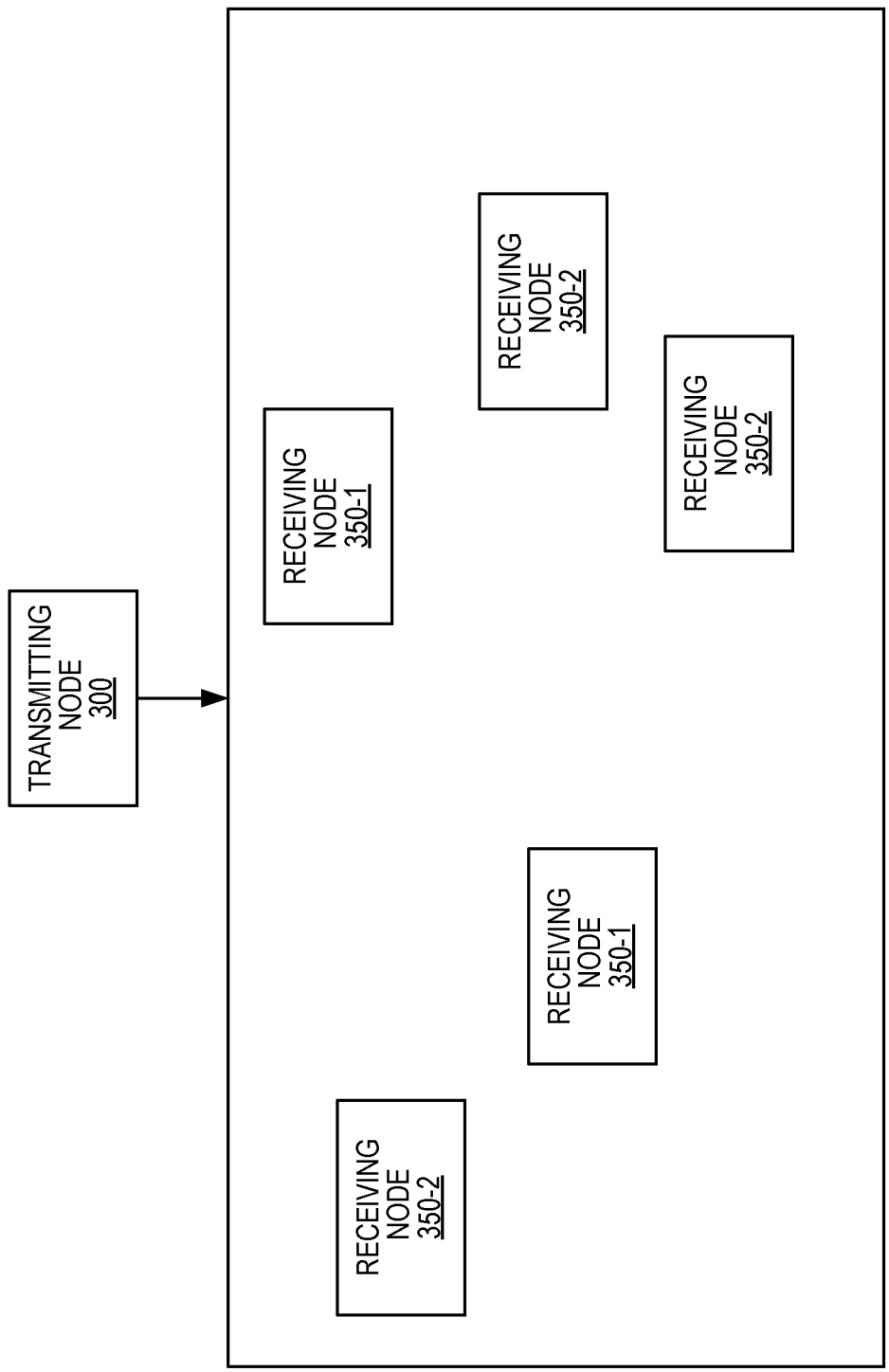
FIG. 1 shows a block diagram of an exemplary wireless communication system.

The solution presented herein facilitates the co-existence of multiple devices in an OFDMA system where different groups of one or more devices use different OFDM numerologies adjusted to their specific needs. For example, FIG. 1 shows an exemplary OFDMA system comprising a transmitting node 300 transmitting to multiple receiving nodes 350, where each different receiving node uses the OFDM numerology suitable for that node's needs. In the exemplary embodiment show in FIG. 1, one or more first receiving nodes 350-1 are associated with a first OFDM numerology, while one or more second receiving nodes 350-2 are associated with a second OFDM numerology. The first OFDM numerology has a first subcarrier spacing and is associated with a first OFDM signal having a first length, while the second OFDM numerology has a second subcarrier spacing greater than the first subcarrier spacing and is associated with a second OFDM signal having a second length. In one exemplary embodiment, the first signal includes one or more first OFDM symbols, each having a first symbol length equaling the inverse of the first subcarrier spacing. In one exemplary embodiment, the second signal includes one or more OFDM symbols, each having a second symbol length equaling the inverse of the second subcarrier spacing. Exemplary first OFDM signals include, but are not limited to, 802.11ax and 802.11n signals. Exemplary second OFDM signals include, but are not limited to 802.11n, 802.11ax, and NB-IoT signals. As used herein, reference number 350 generically represents a receiving radio node associated with some OFDM numerology, while 350-1 and 350-2 more specifically represent receiving nodes associated with a specific OFDM numerology, e.g., the first and second OFDM numerologies, respectively. More generally, the solution presented herein applies to a number of wireless standards, including, but not limited to 802.11, LTE, and 5G. Further, the solution presented herein allows frequency domain multiplexing of any mix of IoT and broadband devices, while addressing simultaneously the following conditions:

Full use of the available bandwidth. No guard bands or null subcarriers are needed.

Energy efficiency or coverage extension achieved by means of power efficient, constant envelope modulations. This is beneficial for IoT transmitters and is realized by means of single subcarrier modulation.

Flexible choice of data rates for all devices, including IoT devices constrained to use a single subcarrier.

Reuse of single FFT OFDMA receiver architecture. One FFT or DFT over the whole band is enough to separate the multiple devices and yields sufficient statistics for the device data.

FIG. 2 shows one exemplary method 100, implemented by a transmitting node 300, of transmitting multiple Orthogonal Frequency Division Multiplexing (OFDM) signals in a mixed numerology OFDM system, e.g., as shown in FIG. 1. Method 100 comprises generating a second OFDM signal associated with a second OFDM numerology and relative to a first OFDM numerology having a first subcarrier spacing and associated with a first OFDM signal having a first length (block 110). The first OFDM signal includes a first OFDM symbol having a first symbol length equal to the inverse of the first subcarrier spacing and less than the first length. The second OFDM numerology has a second subcarrier spacing greater than the first subcarrier spacing. For example, the second signal may be generated by first generating a sub-frame comprising second redundant data, e.g., a second cyclic prefix or a second cyclic post-fix, appended to each of a plurality of second OFDM symbols, where the number of OFDM symbols in the sub-frame is selected such that a length of the sub-frame is as large as possible without exceeding the first symbol length of the first OFDM symbol. The second OFDM signal is then generated by appending group redundant data, e.g., a group cyclic prefix or a group cyclic post-fix, to the sub-frame such that the second length of the second OFDM signal equals the first length of the first OFDM signal. Transmitting node 300 then transmits the second OFDM signal relative to the first OFDM signal (block 120).

FIG. 3 shows an exemplary method 200, implemented by a receiving radio node 350, for processing signals at the receiving radio node 350 in a mixed OFDM numerology system. Method 200 comprises receiving a composite signal that comprises a first OFDM signal and a second OFDM signal (block 210). The first OFDM signal has a first length and is associated with a first OFDM numerology having a first subcarrier spacing. The second OFDM signal is associated with a second OFDM numerology different from the first OFDM numerology and having a second subcarrier spacing greater than the first subcarrier spacing. Method 200 also comprises extracting the first OFDM signal and the second OFDM signal from the composite signal using a single Fourier Transform, e.g., a Discrete Fourier Transform (DFT), configured according to one of the first and second OFDM numerologies (block 220). For example, when the single Fourier Transform comprises a first Fourier Transform configured according to the first OFDM numerology, the receiving radio node 350 extracts the first OFDM signal from the composite signal using the first Fourier Transform and extracts the second OFDM signal from the composite signal using the first Fourier Transform. In some embodiments, the receiving radio node 350 further decodes the extracted first and second OFDM signals.

In some embodiments, once the received time domain signal has been transformed to the frequency domain using the signal Fourier transform, the receiving radio node 350 extracts the first OFDM signal by extracting the frequency domain samples corresponding to the one or more first subcarriers associated with the first OFDM numerology, and extracts the second OFDM signal by extracting the frequency domain samples corresponding to the one or more second subcarriers associated with the second OFDM numerology. In some embodiments, the radio node further extracts the second OFDM signal by transforming the extracted frequency domain samples corresponding to the one or more second subcarriers to the time domain.

In one exemplary embodiment, each first signal comprises first redundant data, e.g., a first cyclic prefix or a first cyclic postfix, appended to the first OFDM symbol. In another exemplary embodiment, the second redundant data used for each second signal comprises a second cyclic prefix or a second cyclic postfix appended to the second OFDM symbol, and/or the group redundant data comprises a group cyclic prefix and/or a group cyclic postfix appended to the sub-frame. In some embodiments, the group redundant data is formed from at least part of one second OFDM symbol, e.g., at least part of the second OFDM symbol that occurs last in the sub-frame. In some exemplary embodiments the transmitting node 300 transmits the first and second signals. For example, the transmitting node 300 may transmit the first and second signals at the same transmission time.

In some embodiments, the subcarrier spacing used for each group of devices is an integer multiple of a given fundamental subcarrier spacing. For example, the second subcarrier spacing may be an integer multiple of the first subcarrier spacing. In some embodiments, the first OFDM signal is orthogonal to the second OFDM signal. In some embodiments, the transmitter apparatuses 310 align the transmissions of the first and second OFDM signals. In some embodiments, a single subcarrier may be allocated to the OFDM signal(s) associated with the OFDM numerology having the larger subcarrier spacing. In some embodiments, the second OFDM signal is transmitted on a second set of one or more second subcarriers, where the second set of one or more second subcarriers do not overlap any of the one or more first subcarriers used to transmit the first OFDM signal. In some embodiments, windowing may be used for the transmission of the OFDM signals associated with the OFDM numerology having the larger subcarrier spacing.

Figure 4:
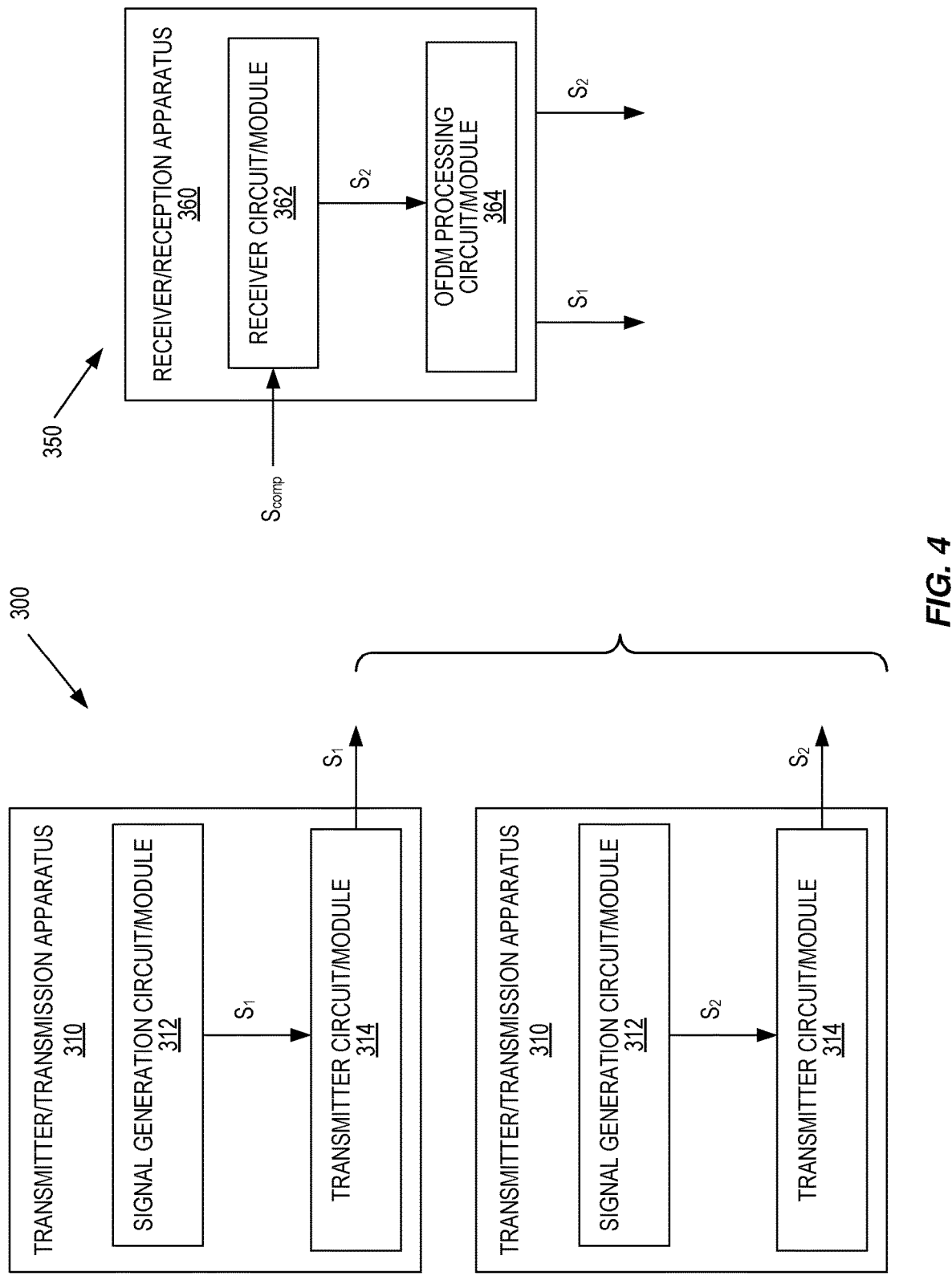
FIG. 4 shows an exemplary OFDM system according to one exemplary embodiment.

Those skilled in the art will appreciate that embodiments herein include corresponding apparatus (e.g., transmitters/receivers, radio nodes, etc.) configured to perform respective methods above. For example, FIG. 4 shows an exemplary OFDM system comprising a transmitting radio node 300 comprising one or more transmitters/transmission apparatus 310 and a receiving radio node 350 comprising a receiver/reception apparatus 360. Each transmitter apparatus 310 comprises a signal generation circuit 312 and a transmitter circuit 314. While the solution is described in terms of a signal generation circuit 312 and a transmitter circuit 314, those skilled in the art will appreciate that the circuits discussed herein may be replaced with one or more modules configured to implement the solution presented herein, e.g., a signal generation module 312 and/or a transmitter module 314.

In one transmitter apparatus 310, which is part of a second group of devices associated with a second OFDM numerology having a second subcarrier spacing greater than a first subcarrier spacing associated with a first OFDM numerology, the signal generation circuit 312 generates at least one second OFDM signal $S_2$ by generating a sub-frame comprising second redundant data, e.g., a second cyclic prefix or post-fix, appended to each of a plurality of second OFDM symbols each having a length equal to the inverse of the second subcarrier spacing, where the number of second OFDM symbols in the sub-frame is selected such that a length of the sub-frame is as large as possible without exceeding a length of a first OFDM symbol associated with the first OFDM numerology. The signal generation circuit 312 further generates the second OFDM signal by appending group redundant data, e.g., a group cyclic prefix or post-fix, to the sub-frame. The transmitter circuit 314 of this transmitter apparatus 310 transmits the second OFDM signal $S_2$ generated by the signal generation circuit 312. In some embodiments, the transmitting radio node 300 comprises another transmitter apparatus 310, which is part of a first group of devices associated with the first OFDM numerology having the first subcarrier spacing. In this transmitter apparatus 310, the signal generation circuit 312 generates at least one first OFDM signal $S_1$ comprising first redundant data, e.g., a first cyclic prefix or post-fix, appended to a first OFDM symbol having a length equal to the inverse of the first subcarrier spacing. In this embodiment, the length of the group redundant data used to generate the second OFDM signal $S_2$ is greater than or equal to the length of the first redundant data such that the length of the second OFDM signal equals a length of the first OFDM signal. The transmitter circuit 314 of this transmitter apparatus 310 transmits the first OFDM signal $S_1$.

The receiver apparatus 360 of the receiving radio node 350 comprises a receiver circuit 362 and an OFDM processing circuit 364. While the solution is described in terms of a receiver circuit 362 and a OFDM processing circuit 364, those skilled in the art will appreciate that the solution presented herein may be implemented by a receiver module 362 and/or an OFDM processing module 364. The receiver circuit 362 receives a composite signal $S_{comp}$ comprising the first and second OFDM signals, $S_1$ and $S_2$. The OFDM processing circuit 364 extracts the first OFDM signal $S_1$ from the received composite signal $S_{comp}$ using a Fourier Transform, e.g., a Discrete Fourier Transform (DFT), configured according to the first OFDM numerology, extracts the second OFDM signal $S_2$ from the received composite signal $S_{comp}$ using the DFT configured according to the first OFDM numerology. The OFDM processing circuit 364 may also decode the extracted signals to generate the first and second OFDM signals.

It will be appreciated that the elements of FIG. 4 are described in terms of one disclosed embodiment, but that these devices may be used to implement any of the disclosed transmission and/or reception embodiments. Further, while the OFDM processing circuit 364 is described in terms of a Fourier Transform configured according to the first OFDM numerology to extract both the first and second OFDM signals, it will be appreciated that in alternate embodiments the OFDM processing circuit 364 may extract each of the first and second OFDM signals using a Fourier Transform configured according to the second OFDM numerology.

In one exemplary embodiment, the solution presented herein may be used for an OFDMA wireless system where devices are grouped according to their OFDM numerology, and where each OFDM numerology possesses its own redundant data length, e.g., its own cyclic prefix (CP) length, and its own system bandwidth (system design parameters). Devices in the group associated with the OFDM numerology having the smallest subcarrier spacing, which may be referred to as the minimum subcarrier-spacing group, build their OFDM signals by appending redundant data of a predetermined length, where this length is a system design parameter, to each OFDM symbol associated with the minimum subcarrier spacing group. The transmission times for these OFDM signals may be aligned at the OFDM symbol boundaries. The devices in the group(s) associated with the OFDM numerology(ies) having a subcarrier spacing strictly larger than the subcarrier spacing employed by the devices in the minimum subcarrier-spacing group build their signals by:

Appending redundant data to each OFDM symbol. This redundant data length is a system design parameter and need not agree with the redundant data employed by devices in other groups.

Grouping the OFDM symbols (after redundant data insertion) into a sub-frame. The number of OFDM symbols in each sub-frame is the largest possible such that the total length of the sub-frame does not exceed the length of one single minimum subcarrier-spacing group OFDM symbol without its redundant data.

Append additional redundant data (optional) to the last OFDM symbol in the sub-frame.

Append group redundant data to the sub-frame. The group redundant data must be at least as long the redundant data used by devices in the minimum subcarrier-spacing group.

The total length of the combination of the optional additional redundant data and the group redundant data is such that when added to the rest of the sub-frame, the resulting signal has a length that equals the length of one OFDM signal generated for the minimum subcarrier spacing group, i.e., equals the length of one minimum subcarrier-spacing group OFDM symbol with its appended redundant data. In other words, the length of the group redundant data and optional additional redundant data are not design parameters, but rather are dependent on the OFDM numerologies and the redundant data lengths required for each OFDM numerology. In one embodiment, the transmission time of the boundaries of the OFDM signal generated for the minimum subcarrier-spacing group should coincide with the transmission time of the boundaries of the OFDM signal having the appended group redundant data. In some embodiments, the transmission time of the OFDM signals is selected such that the OFDM signal associated with the minimum subcarrier spacing group arrive at the receiver at the same time as the OFDM signal having the appended group redundant data. In some embodiments, devices in groups different from the minimum subcarrier-spacing group are allocated a single subcarrier, e.g., to cover constant envelope modulation. In some embodiments, devices in groups having a subcarrier spacing greater than the subcarrier spacing of the minimum subcarrier-spacing group use windowing in their transmissions. In some embodiments, the receiver receiving the OFDM signals for the multiple groups of devices employs one Fourier Transform, e.g., one DFT, to separate in the frequency domain all of the devices belonging to all of the groups. In some embodiments, the appended group redundant data added to the sub-frames associated with the devices in groups different from the minimum subcarrier-spacing group may be used as a repetition code at the receiver, so as to improve the receiver performance.

The following describes the solution generally presented above by means of additional examples, using 802.11 wireless systems as an inspiration along with FIGS. 5-9. These examples are described in terms of redundant data. As discussed above, however, it will be appreciated that the solution presented herein is not limited to these specific examples.

Suppose that it is desired to multiplex two or more devices in a 20 MHz frequency band. Devices in a first group employ a number of non-overlapping subcarriers in a 20 MHz frequency band, using a subcarrier spacing equal to 312.5 kHz=20/64 MHz, as in an 802.11n system. A second group of devices is assigned a set of non-overlapping subcarriers in the same 20 MHz frequency band, but using a subcarrier spacing equal to 78.24 kHz=20/256 MHz, as in an 802.11ax system. There are several suggested lengths for the Cyclic Prefix (CP) in 802.11ax, including 0.8 μs, 1.6 μs, and 3.2 μs. The following gives examples corresponding to all of these CP lengths. Devices in the 802.11n system typically use a 0.8 CP. Note that in some embodiments, the subcarrier spacing in one numerology is an integer multiple of the subcarrier spacing in the other numerology, e.g., 4*20/256 MHz=20/64 MHz.

Figure 5:
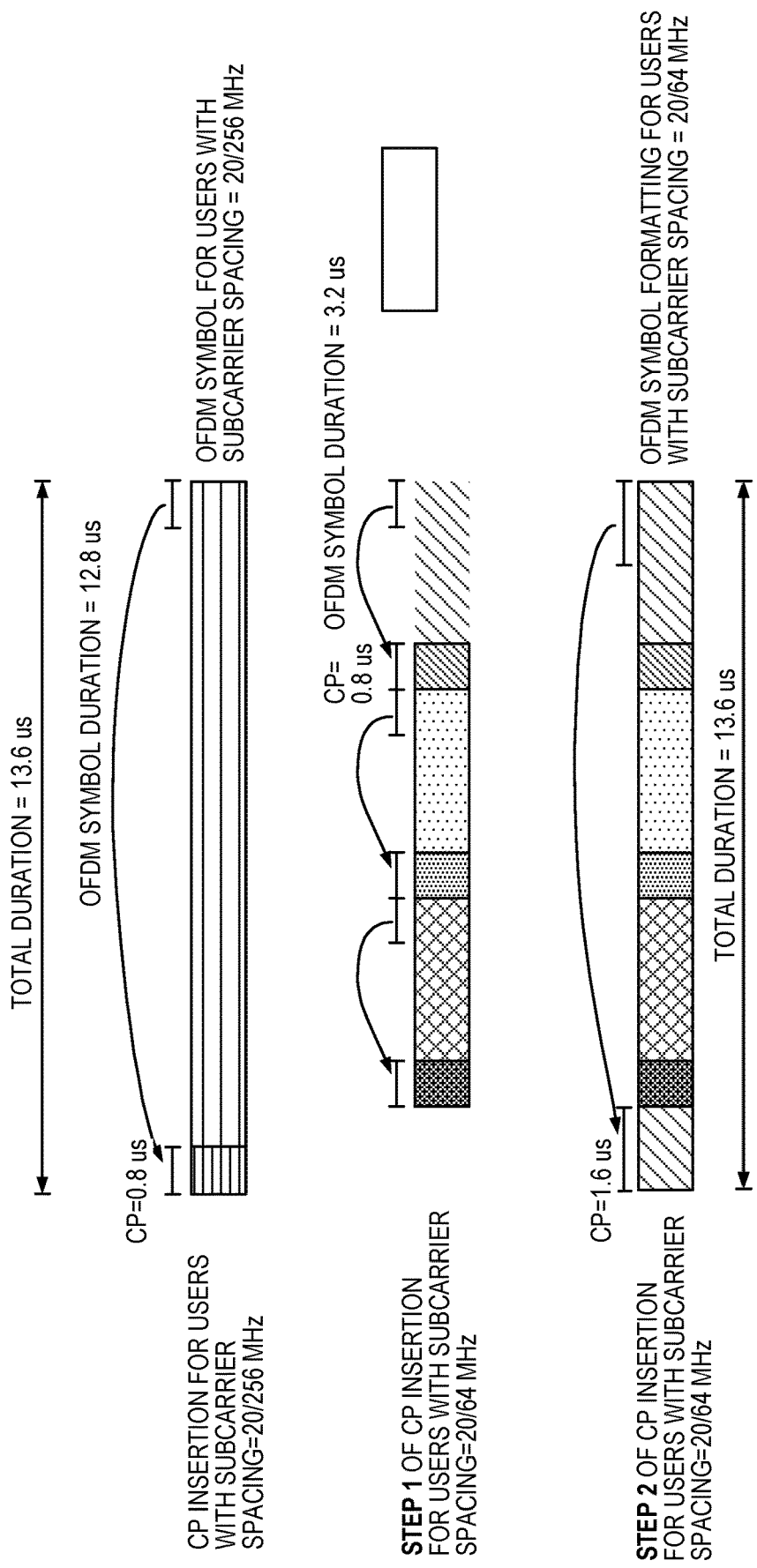
FIG. 5 shows the generation of signals for different devices associated with different OFDM numerologies according to one exemplary embodiment.
Figure 6:
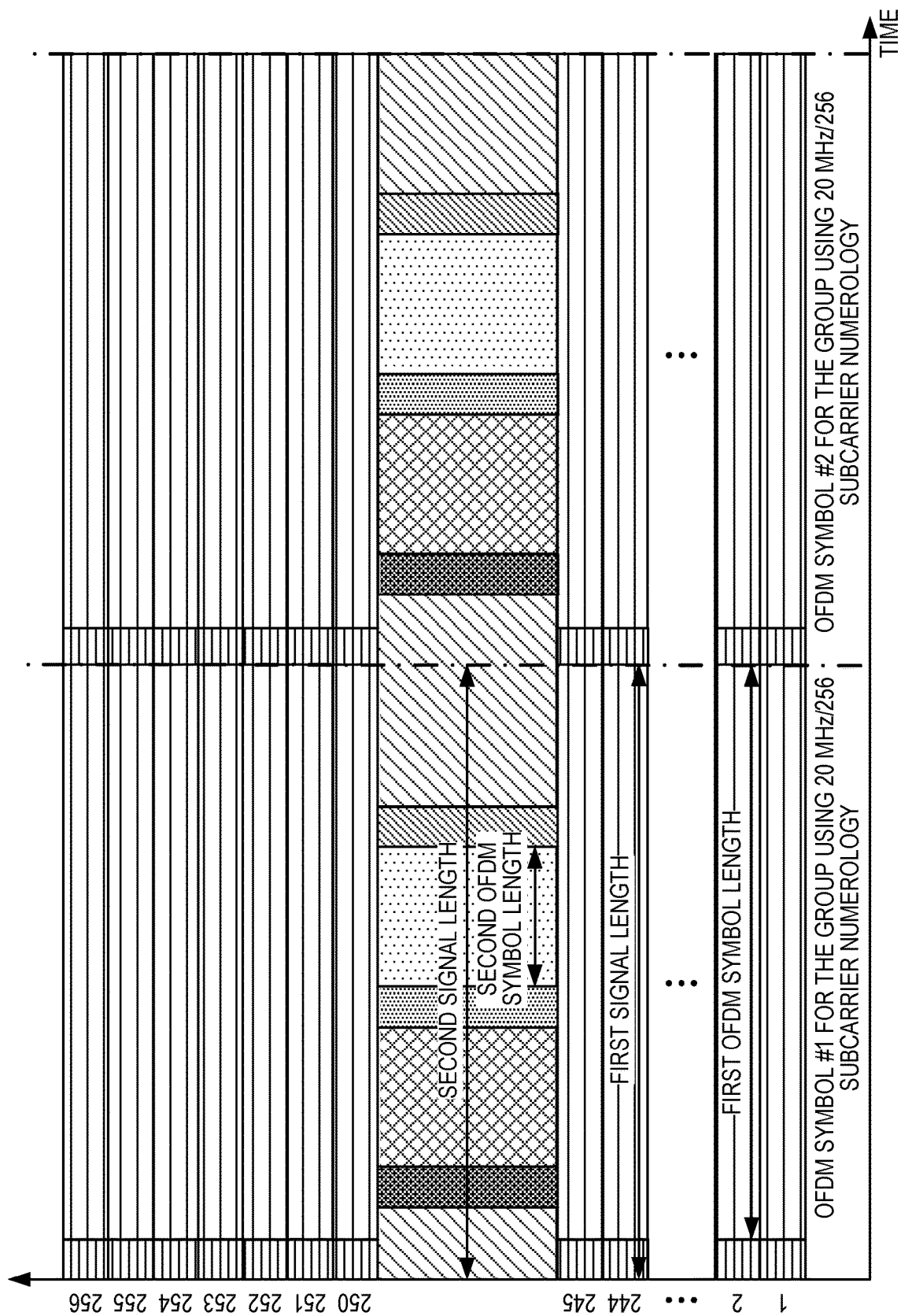
FIG. 6 shows the multiplexing of the signals from FIG. 5 according to one exemplary embodiment.

Suppose first that the CP length for the 20/256 MHz numerology is 0.8 The OFDM symbol length, prior to CP insertion is 256/20 MHz=12.8 After appending the CP to the OFDM symbol, the total length becomes 13.6 μs, as shown in FIG. 5. All devices employing this numerology align the transmission time of the OFDM symbol boundaries, and format the OFDM symbols as shown in FIG. 5. That is, these devices employ ordinary OFDMA using the 256/20 MHz numerology. Devices belonging to the second group of devices format their OFDM transmission as indicated in FIG. 6. First, the second group of devices will build groups of three OFDM symbols, and append 0.8 μs prefixes to each of the symbols in the group, as illustrated by STEP 1 in FIG. 5. The reason to build groups of three OFDM symbols is that, including the CP, it is the maximum number of symbols whose combined length does not exceed the length of the OFDM symbol for the first group, prior to CP insertion. That is, we seek the largest integer N such that (3.2 μs+0.8 μs)*N<12.8 μs. The answer is N=3, because (3.2 μs+0.8 μs)*3=12 μs. In the next step we append a second CP of length 1.6 μs, as shown in STEP 2 in FIG. 5. Note that this second CP differs from the STEP 1 CP's in that it is appended at the beginning of the whole group of OFDM symbols, and not to the individual OFDM symbols. With this formatting, each group of three OFDM symbols, including the two step CP insertion, will have a total duration of 13.6 μs. This group of formatted OFDM symbols may be called a 20 MHz/256-compatible frame or signal. Note that the length of the second CP is determined by the 20/256 MHz numerology, such that the total length of the frame, comprising three OFDM symbols plus their CPs, and a second step group CP, is equal to the duration of one 20/256 MHz numerology OFDM symbol, plus it's CP. The transmission times for these 13.6 μs long compatible signals may be aligned with the transmission times of the signals for the group one devices. FIG. 6 shows a time-frequency diagram, showing how one or more group one devices and one group two device are multiplexed. The group two device occupies the subband corresponding to subcarriers 246, 247, 248, and 249 in the 20/256 MHz numerology. Subcarriers 1-245 and 250-256 are occupied by the group one devices.

In one embodiment of the solution presented herein, some devices in the second group will be assigned only one subcarrier. In this way constant envelope modulation can be achieved. The theoretical data rate for this devices would be 312500*(3.2*3/13.6) ksymbs/sec=220.6 ksymbs/sec.

Figure 7:
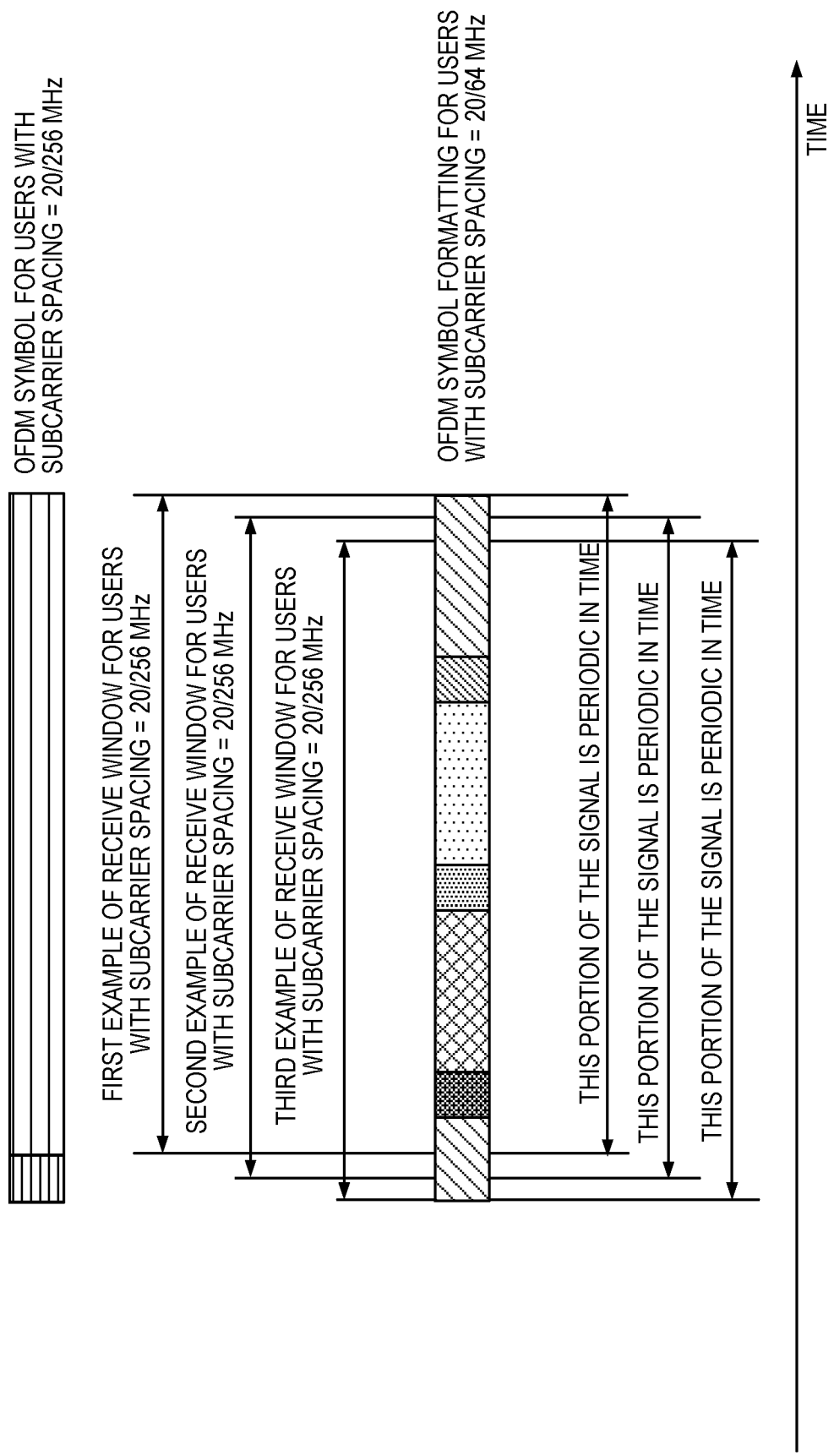
FIG. 7 shows windowing of the transmitted signals according to one exemplary embodiment.

The reason to apply a two-step CP to the group two devices is explained with the help of FIG. 7. As explained earlier, it is desired to separate the devices using only one OFDM receiver chain for all the devices and all the groups. In this example a single 20/256 MHz subcarrier receiver chain could be used. The receiver synchronizes the timing in order to extract the OFDM symbols for the group one devices. Due to timing inaccuracies, any of the three windows shown in FIG. 7 could be used to extract the OFDM symbols for group one devices. The DFT is applied to these time domain samples. In order to preserve orthogonality among group one and group two, the signals belonging to the group two devices are periodic, independently of the chosen window. An aperiodic signal can't be represented as the superposition of a finite number of sinusoids, and therefore the DFT would leak energy from the group two devices into the group one devices' signals.

Figure 8:
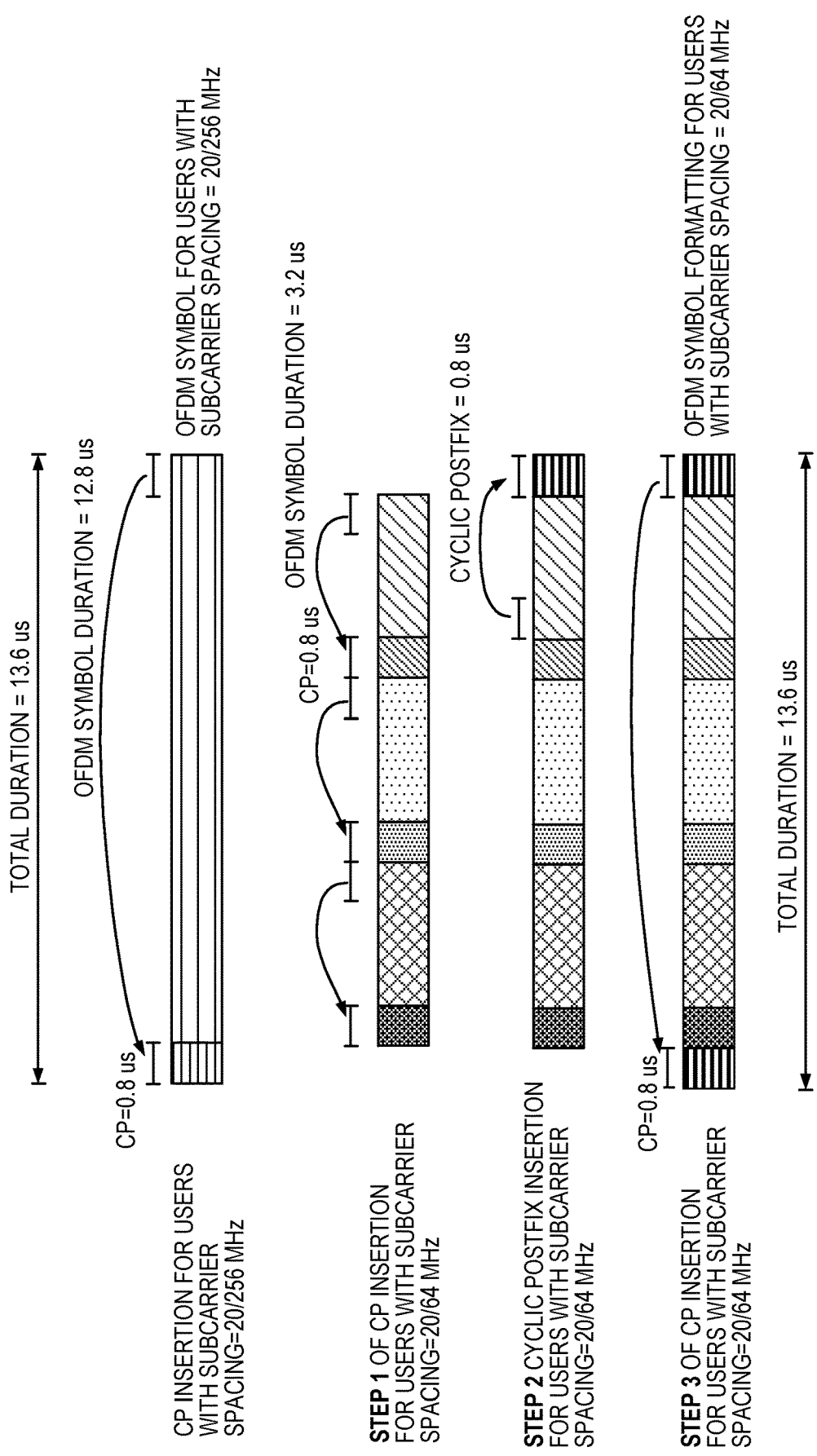
FIG. 8 shows the generation of signals for different devices associated with different OFDM numerologies according to another exemplary embodiment.

In a second embodiment of the solution presented herein, we use the same numerology and CP as in the previous example, but format the signal for the group two devices differently. Group one devices build their signals as in the previous example. Group two devices proceed as shown in FIG. 8. The group two devices build groups of three OFDM symbols, and append 0.8 μs prefixes to each of these three symbols, as illustrated by STEP 1 in FIG. 8. In STEP 2, a 0.8 μs cyclic postfix is appended to the last symbol, as shown in FIG. 8. In STEP 3, a 0.8 μs CP is appended at the beginning of the group of OFDM symbols. That is, the appending of the CP in STEP 3 differs from the appending of the CP in STEP 1 because the CP is located not at the beginning of the OFDM symbol from which it was extracted, but at the beginning of the sub-frame of the group of symbols. Just as before, the total length of 20/256 MHz-compatible frame is 13.6 μs. The transmission times for these frames may be aligned with the transmission times of the group one OFDM symbols. Observe that the STEP 3 CP needs to be at least as long as the CP for group one devices. Note that the cyclic postfix can be used at the receiver side as a repetition code, thus increasing the robustness of the group two transmissions.

Figure 9:
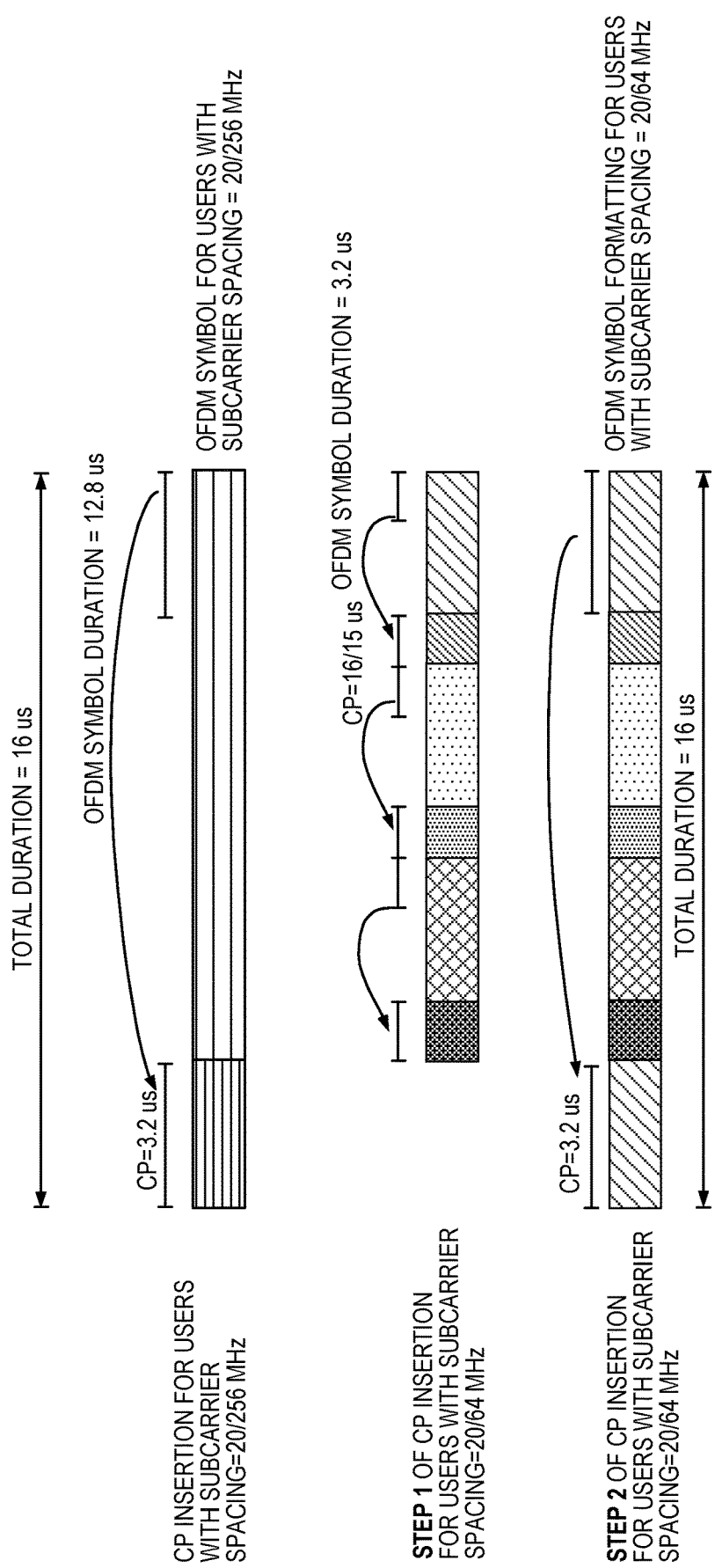
FIG. 9 shows the generation of signals for different devices associated with different OFDM numerologies according to another exemplary embodiment.

FIG. 9 depicts a third embodiment of the solution presented herein, when the group one devices employ a CP length of 3.2 μs. This case is very similar to the first example except that the (whole) last OFDM symbol is used as cyclic prefix for the sub-frame. Thus, with these system parameters, the whole last OFDM symbol can be used a repetition code.

The use of windowing at the transmitter is recommended in 802.11 wireless systems, in order to suppress side lobes in the spectrum. It can also be advantageous to use together with the OFDM format described in the solution presented herein. Group one devices are totally orthogonal to group two devices, but group two devices are orthogonal to group one devices only on selected subcarriers. There is some residual ICI left in some of the group one subcarriers. This ICI may be reduced to any desired level by an application of windowing to the group two transmissions.

It will be appreciated that the solution presented herein may be extended to more than two OFDM numerologies. As such, the solution presented herein may be extended to three or more groups of devices employing different OFDM numerologies, where one of the OFDM numerologies represents a minimum subcarrier spacing OFDM numerology. For example, the solution presented herein may be extended for a third group of devices using a third OFDM numerology, e.g., a 20/32 MHz-subcarrier numerology, and using a CP of 0.8 μs. It will be appreciated that for each additional group of devices/OFDM subcarrier spacing, the signal generation follows the same process as the signal generation for the second group of devices, e.g., the group of devices associated with the non-minimum subcarrier spacing.

Those skilled in the art will also appreciate that embodiments herein further include corresponding computer programs. A computer program comprises instructions which, when executed on at least one processor of a transmitter or receiver, cause the transmitter or receiver to carry out any of the respective processes described above. A computer program in this regard may comprise one or more code modules corresponding to the means or units described above. Some embodiments may further include a carrier containing such a computer program. This carrier may comprise one of an electronic signal, optical signal, radio signal, or computer readable storage medium.

In one or more embodiments, for example, the transmitter and/or receive described herein operates according to narrowband Internet of Things (NB-IoT) specifications. In this regard, embodiments described herein are explained in the context of operating in or in association with a Radio Access Network (RAN) that communicates over radio communication channels with wireless communication devices, also interchangeably referred to as wireless terminals or UEs, using a particular radio access technology. More specifically, embodiments may be described herein in the context of the development of specifications for NB-IoT, particularly as it relates to the development of specifications for NB-IoT operation in spectrum and/or using equipment currently used by E-UTRAN, sometimes referred to as the Evolved UMTS Terrestrial Radio Access Network and widely known as the LTE system. However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

A radio node can be any type of node capable of communicating with another node via wireless/radio signals. A transmitter or a transmitting apparatus may be a radio node configured to transmit radio signals to another node. Conversely, a receiver or a receiving apparatus may be a radio node configured to receive radio signals from another node. In the context of the solution presented herein, it should be understood that a radio node may be a wireless (communication) device or a radio network node (e.g., a base station). A wireless device may refer to a machine-to-machine (M2M) device, a machine-type communications (MTC) device, and/or a NB-IoT device. The wireless device may also be a User Equipment (UE), however it should be noted that the UE does not necessarily have a "user" in the sense of an individual person owning and/or operating the device. A wireless device may also be referred to as a radio device, a radio communication device, a wireless terminal, or simply a terminal. Unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms M2M device, MTC device, wireless sensor, and sensor may also be used.

It should be understood that these devices may be UEs, but are generally configured to transmit and/or receive data without direct human interaction. In an IoT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

It will be appreciated that the claims appended herein cover various embodiments. Further, while not explicitly recited in the appended claims, additional features are available for the claimed solution, as detailed throughout this specification, including but not limited to the following:

- The group redundant data comprises one of the second OFDM symbols in its entirety.
- A length of the group redundant data is greater than or equal to the length of the first redundant data.
- Transmitting the second OFDM signal relative to the first OFDM signal comprises aligning a transmission time of the second OFDM signal with a transmission time of the first OFDM signal.
- Transmitting the second OFDM signal relative to the first OFDM signal comprises transmitting the second OFDM signal at a transmission time such that the second OFDM signal arrives at a receiver time aligned with the first OFDM signal.
- A first group of one or more first receiving nodes (350) are associated with the first OFDM numerology, a second group of one or more second receiving nodes (350) are associated with the second OFDM numerology, and transmitting the second OFDM signal relative to the first OFDM signal comprises transmitting the first and second OFDM signals to the respective first and second receiving nodes (350).
- The second OFDM signal is periodic.
- The first OFDM signal comprises an 802.11n signal, and the second OFDM signal comprises an 802.11ax signal.
- A second symbol length of each of the second OFDM symbols equals the inverse of the second subcarrier spacing.
- A computer program product comprising software instructions which, when run on a processing circuit in the radio node, causes the radio node to carry out the method of the transmitting radio node.
- The transmitting radio node comprises a wireless communication device configured to transmit the first and second OFDM signals to a remote radio network node via an uplink channel.
- The transmitting radio node comprises a radio network node configured to transmit the first and second OFDM signals to a wireless communication device via a downlink channel.
- Where a carrier contains the computer program of for the transmitting radio node, and wherein the carrier is an electronic signal, optical signal, radio signal, or non-transitory computer readable medium.
- The one or more transmitters (314) comprise separate first and second transmitters (314) configured to respectively transmit the first and second OFDM signals.
- The one or more transmitters (314) comprise a single transmitter (314) configured to transmit the first and second OFDM signals.
- The one or more transmitters (314) are further configured to align a transmission time of the second OFDM signal with a transmission time of the first OFDM signal.
- The one or more transmitters (314) transmit the second OFDM signal by transmitting the second OFDM signal at a transmission time such that the second OFDM signal arrives at a receiving node (350) time aligned with the first OFDM signal.
- The radio node (300) comprises a wireless communication device configured to transmit the first and second OFDM signals to a remote radio network node via an uplink channel.
- The radio node (300) comprises a radio network node configured to transmit the first and second OFDM signals to a wireless communication device via a downlink channel.
- The reception method comprises applying a window to the composite signal, wherein the second OFDM signal is periodic in time within the applied window, and applying the single Fourier Transform to time domain samples in the applied window to extract the first and second OFDM signals.
- The first and second OFDM signals are time aligned and have the same length.
- The group redundant data comprises one of the second OFDM symbols.
- The first OFDM signal is orthogonal to the second OFDM signal.
- The second OFDM signal is orthogonal to the first OFDM signal on selected subcarriers.
- The first OFDM signal comprises an 802.11ax signal.
- The second OFDM signal comprises an 802.11n signal.
- The second OFDM signal comprises a narrowband Internet of Things (NB-IoT) signal transmitted from an NB-IoT device.
- A first group of one or more first receiving nodes (350) are associated with the first OFDM numerology, and a second group of one or more second receiving nodes (350) are associated with the second OFDM numerology.
- Receiving the composite signal comprises receiving, via an uplink channel, the composite signal at a radio network node from a wireless communication device.
- Receiving the composite signal comprises receiving, via a downlink channel, the composite signal at a wireless communication device from a radio network node.
- A computer program product comprising software instructions which, when run on a processing circuit in the radio node, causes the radio node to carry out the processing method of the reception radio node.
- Where a carrier containing the computer program is an electronic signal, optical signal, radio signal, or non-transitory computer readable medium.
- The reception radio node comprises a wireless communication device configured to receive the composite signal via a downlink channel from a remote radio network node.
- The reception radio node comprises a radio network node configured to receive the composite signal via an uplink channel from a wireless communication device.
- The processing circuit extracts the first and second OFDM signals from the composite signal by applying a window to the composite signal, wherein the second OFDM signal is periodic in time within the applied window and applying the single Fourier Transform to time domain samples in the applied window to extract the first and second OFDM signals.

The first and second OFDM signals are time aligned and have the same length.

A first group of one or more first receiving nodes (350) are associated with the first OFDM numerology, and a second group of one or more second receiving nodes (350) are associated with the second OFDM numerology.

The radio node (350) comprises a radio network node, and the receiver (362) is configured to receive the composite signal from a wireless communication device via an uplink channel.

The radio node (350) comprises a wireless communication device, and the receiver (362) is configured to receive the composite signal from a radio network node via a downlink channel.

The solution presented herein may, of course, be carried out in other ways than those specifically set forth herein without departing from essential characteristics of the solution presented herein. The present embodiments are to be considered in all respects as illustrative and not restrictive, and all changes coming within the meaning and equivalency range of these embodiments are intended to be embraced therein.

What is claimed is:

1. A method, implemented by a transmitting radio node, for transmitting Orthogonal Frequency Division Multiplexing (OFDM) signals in a mixed numerology OFDM system relative to a first OFDM numerology having a first subcarrier spacing and associated with a first OFDM signal having a first length, the first OFDM signal comprising a first OFDM symbol having a first symbol length equal to the inverse of the first subcarrier spacing and less than the first length, the method comprising:
    generating a second OFDM signal having a second length and associated with a second OFDM numerology having a second subcarrier spacing greater than the first subcarrier spacing, wherein generating the second OFDM signal comprises:
        generating a sub-frame comprising second redundant data appended to each of a plurality of second OFDM symbols, wherein the number of second OFDM symbols in the sub-frame is selected such that a length of the sub-frame is as large as possible without exceeding the first symbol length of the first OFDM symbol; and
        generating the second OFDM signal by appending group redundant data to the sub-frame such that the second length of the second OFDM signal equals the first length of the first OFDM signal; and
    transmitting the second OFDM signal relative to the first OFDM signal.

2. The method of claim 1, wherein the second redundant data comprises one of a second cyclic prefix and a second cyclic postfix appended to each of the second OFDM symbols.

3. The method of claim 1, wherein the group redundant data comprises a group cyclic prefix appended to the beginning of the sub-frame or a group cyclic postfix appended to the end of the sub-frame.

4. The method of claim 1, wherein the group redundant data comprises a group cyclic prefix appended to the beginning of the sub-frame and a group cyclic postfix appended to the end of the sub-frame, the group cyclic prefix and the group cyclic postfix having a combined length such that the second length of the second OFDM signal equals the first length of the first OFDM signal.

5. A radio node configured to transmit Orthogonal Frequency Division Multiplexing (OFDM) signals in a mixed numerology OFDM system relative to a first OFDM numerology having a first subcarrier spacing and associated with a first OFDM signal having a first length, the first OFDM signal comprising a first OFDM symbol having a first symbol length equal to the inverse of the first subcarrier spacing and less than the first length, the radio node comprising:
    one or more signal generation circuits configured to generate a second OFDM signal having a second length and associated with a second OFDM numerology having a second subcarrier spacing greater than the first subcarrier spacing, wherein the one or more signal generation circuits are configured to generate the second OFDM signal by:
        generating a sub-frame comprising second redundant data appended to each of a plurality of second OFDM symbols, where the number of second OFDM symbols in the sub-frame is selected such that a length of the sub-frame is as large as possible without exceeding the first symbol length of the first OFDM symbol; and
        generating the second OFDM signal by appending group redundant data to the sub-frame such that the second length of the second OFDM signal equals the first length of the first OFDM signal; and
    one or more transmitters configured to transmit the second OFDM signal relative to the first OFDM signal.

6. The radio node of claim 5, wherein the second redundant data comprises one of a second cyclic prefix and a second cyclic postfix appended to each of the second OFDM symbols.

7. The radio node of claim 5, wherein the group redundant data comprises a group cyclic prefix appended to the beginning of the sub-frame or a group cyclic postfix appended to the end of the sub-frame.

8. The radio node of claim 5, wherein the group redundant data comprises a group cyclic prefix appended to the beginning of the sub-frame and a group cyclic postfix appended to the end of the sub-frame, the group cyclic prefix and the group cyclic postfix having a combined length such that the second length of the second OFDM signal equals the first length of the first OFDM signal.

9. A method, implemented by a receiving radio node, for processing received signals in a mixed numerology Orthogonal Frequency Division Multiplexing (OFDM) system, the method comprising:
    receiving a composite signal comprising:
        a first OFDM signal having a first length and associated with a first OFDM numerology having a first subcarrier spacing; and
        a second OFDM signal associated with a second OFDM numerology different from the first OFDM numerology and having a second subcarrier spacing greater than the first subcarrier spacing, wherein the second subcarrier spacing is an integer multiple of the first subcarrier spacing;
    wherein the first OFDM signal comprises first redundant data appended to a first OFDM symbol having a first symbol length equal to the inverse of the first subcarrier spacing, and the second OFDM signal comprises group redundant data appended to a sub-frame comprising second redundant data appended to each of a plurality of second OFDM symbols, each second OFDM symbol having a second symbol length equal to the inverse of the second subcarrier spacing, where a length of the group redundant data is greater than or equal to the length of the first redundant data such that the second length of the second OFDM signal equals the first length of the first OFDM signal; and extracting the first OFDM signal and the second OFDM signal from the composite signal using a single Fourier Transform configured according to one of the first and second OFDM numerologies.

10. The method of claim 9, wherein the Fourier Transform comprises a first Fourier Transform configured according to the first OFDM numerology, and wherein extracting the first and second OFDM signals comprises:

extracting the first OFDM signal from the composite signal using the first Fourier Transform; and extracting the second OFDM signal from the composite signal using the first Fourier Transform.

11. The method of claim 9, wherein extracting the second OFDM signal comprises:

transforming the composite signal from a time domain to a frequency domain using the single Fourier Transform to generate a frequency domain signal comprising a plurality of frequency domain samples;

extracting the first OFDM signal by extracting the frequency domain samples corresponding to one or more first subcarriers associated with the first OFDM numerology; and extracting the second OFDM signal by extracting the frequency domain samples corresponding to one or more second subcarriers associated with the second OFDM numerology.

12. The method of claim 11, wherein extracting the second OFDM signal further comprises transforming the frequency domain samples corresponding to the one or more second subcarriers to the time domain.

13. A radio node for processing received signals in a mixed numerology Orthogonal Frequency Division Multiplexing (OFDM) system, the radio node comprising:

a receiver configured to receive a composite signal comprising:
- a first OFDM signal having a first length associated with a first OFDM numerology having a first subcarrier spacing; and
- a second OFDM signal associated with a second OFDM numerology different from the first OFDM numerology and having a second subcarrier spacing greater than the first subcarrier spacing, wherein the second subcarrier is an integer multiple of the first subcarrier spacing;

wherein the first OFDM signal comprises first redundant data appended to a first OFDM symbol having a first symbol length equal to the inverse of the first subcarrier spacing, and the second OFDM signal comprises group redundant data appended to a subframe comprising second redundant data appended to each of a plurality of second OFDM symbols, each second OFDM symbol having a second symbol length equal to the inverse of the second subcarrier spacing, where a length of the group redundant data is greater than or equal to the length of the first redundant data such that the second length of the second OFDM signal equals the first length of the first OFDM signal; and one or more processing circuits configured to extract the first OFDM signal and the second OFDM signal from the composite signal using a single Fourier Transform configured according to one of the first and second OFDM numerologies.

14. The radio node of claim 13, wherein the Fourier Transform comprises a first Fourier Transform configured according to the first OFDM numerology, and wherein the one or more processing circuits are configured to extract the first and second OFDM signals by:

extracting the first OFDM signal from the composite signal using the first Fourier Transform; and extracting the second OFDM signal from the composite signal using the first Fourier Transform.

15. The radio node of claim 13, wherein the one or more processing circuits are configured to extract the second OFDM signal by:

transforming the composite signal from a time domain to a frequency domain using the single Fourier Transform to generate a frequency domain signal comprising a plurality of frequency domain samples;

extracting the first OFDM signal by extracting the frequency domain samples corresponding to one or more first subcarriers associated with the first OFDM numerology; and extracting the second OFDM signal by extracting the frequency domain samples corresponding to one or more second subcarriers associated with the second OFDM numerology.

16. The radio node of claim 15, wherein the one or more processing circuits are configured to transform the frequency domain samples corresponding to the one or more second subcarriers to the time domain.

* * * * *